United States Patent
Hardi

(10) Patent No.: US 11,086,642 B2
(45) Date of Patent: *Aug. 10, 2021

(54) TRUE WIRELESS HEADPHONES WITH IMPROVED USER INTERFACE TO AN EXPERIENTIAL ECO-SYSTEM AND RELATED DEVICES, METHODS, AND SYSTEMS

(71) Applicant: MUZIK INC., West Hollywood, CA (US)

(72) Inventor: Jason Hardi, Beverly Hills, CA (US)

(73) Assignee: Muzik Inc., West Hollywood, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/686,905

(22) Filed: Nov. 18, 2019

(65) Prior Publication Data
US 2020/0174805 A1 Jun. 4, 2020

Related U.S. Application Data

(63) Continuation of application No. 16/126,982, filed on Sep. 10, 2018, now Pat. No. 10,489,172.

(60) Provisional application No. 62/555,766, filed on Sep. 8, 2017.

(51) Int. Cl.
*G06F 9/451* (2018.01)
*G06F 3/16* (2006.01)
*G06F 1/16* (2006.01)
*G06F 1/26* (2006.01)
*G06F 3/01* (2006.01)
*H04R 1/10* (2006.01)

(52) U.S. Cl.
CPC .............. *G06F 9/451* (2018.02); *G06F 1/163* (2013.01); *G06F 1/1688* (2013.01); *G06F 1/1694* (2013.01); *G06F 1/263* (2013.01); *G06F 1/266* (2013.01); *G06F 3/017* (2013.01); *G06F 3/167* (2013.01); *G06F 2203/0383* (2013.01); *H04R 1/1016* (2013.01); *H04R 1/1025* (2013.01); *H04R 1/1041* (2013.01); *H04R 2420/07* (2013.01)

(58) Field of Classification Search
None
See application file for complete search history.

(56) References Cited

U.S. PATENT DOCUMENTS

2018/0374482 A1* 12/2018 Woo .................. G06F 3/167
2019/0152065 A1* 5/2019 Song ................. G06F 3/167

* cited by examiner

*Primary Examiner* — Craig C Dorais
(74) *Attorney, Agent, or Firm* — Stanek Lemon Crouse & Meeks, P.A.

(57) ABSTRACT

A system to provide a curated experience can include an application experience compiler configured to receive data indicating an intent for a user to complete a transaction based on spoken audio and a cross-bar array of a plurality of apps, wherein each app is specified to perform at least a discrete function included as part of the transaction, the cross-bar array of the plurality of apps configured to couple outputs of ones of the plurality of apps to inputs of others of the plurality of apps using respective apis of the plurality of apps.

16 Claims, 16 Drawing Sheets

TRUE WIRELESS HEADPHONES WITH IMPROVED USER INTERFACE TO AN EXPERIENTIAL ECO-SYSTEM AND RELATED DEVICES, METHODS, AND SYSTEMS

CLAIM FOR PRIORITY

This application claims priority to U.S. patent application Ser. No. 16/126,982; filed Sep. 10, 2018, entitled TRUE WIRELESS HEADPHONES WITH IMPROVED USER INTERFACE TO AN EXPERIENTIAL ECO-SYSTEM AND RELATED DEVICES, METHODS, AND SYSTEMS filed in the U.S. Patent and Trademark Office, which claims priority to U.S. Provisional Application Ser. No. 62/555,766, filed Sep. 8, 2017, entitled WEARABLE AUDIO/VIDEO COMPUTER SYSTEMS filed in the U.S. Patent and Trademark Office, the disclosures of which are hereby incorporated by reference in their entireties.

FIELD

The present invention relates to the field of electronics in general, and more particularly, to wearable audio electronics.

BACKGROUND

Wireless earbuds, also known as wireless in-ear headphones or earphones, are expected to become increasingly popular. The advent and rapid growth of digital audio streaming services, such as Spotify, Pandora, Rhapsody, Google Play Music All Access, iTunes Radio, Music Unlimited, Rdio, Xbox Music and Beats Music, are likely drivers behind the expected growing popularity and desire for wireless earbuds.

Some characteristics of wireless earbuds are physical size, convenience and user-friendliness, battery life, etc., however, many current true wireless earbuds have fallen short of user's expectations regarding many of these characteristics.

SUMMARY

Embodiments according to the invention can provide true wireless headphones (such as earbuds) with an improved user interface to an experiential eco-system and related devices, methods, and systems.

DETAILED DESCRIPTION

Figure 1:
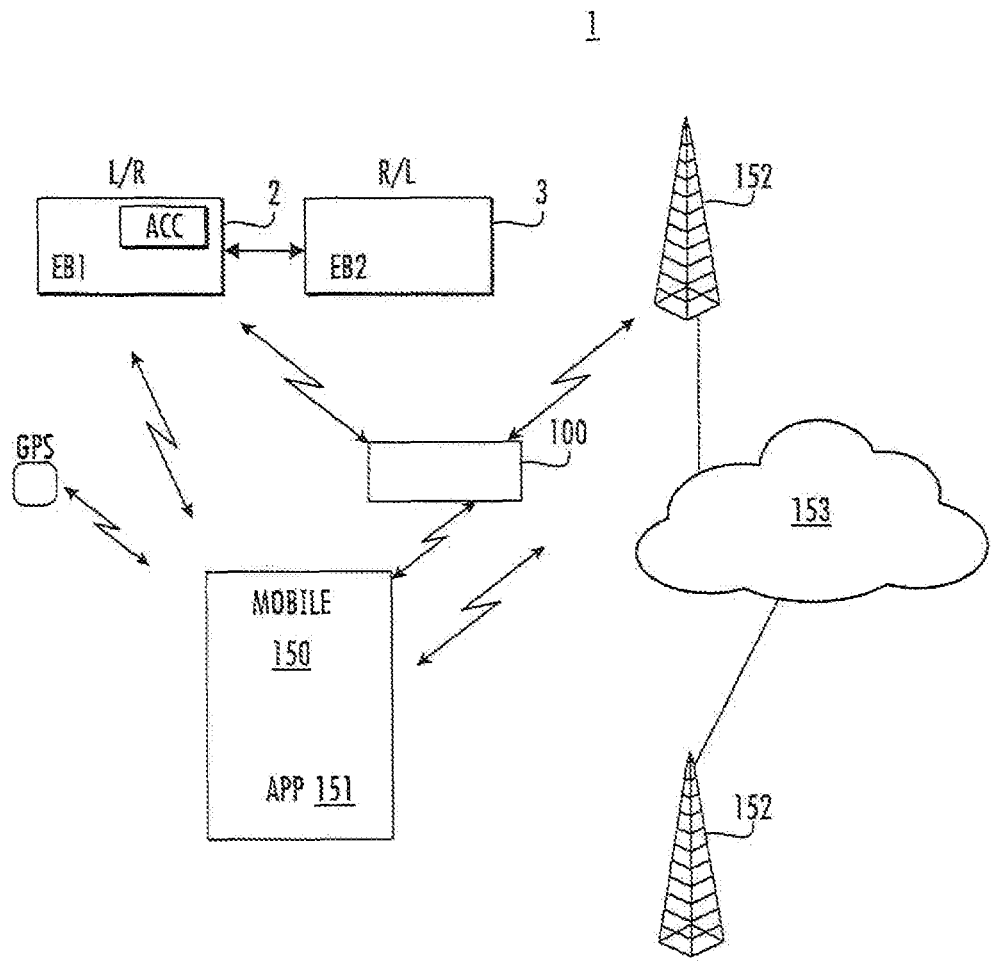
FIG. 1 is a schematic diagram of an experiential eco-system utilizing true wireless headphones in some embodiments according to the invention.

Advantages and features of present inventive concepts may be understood more readily by reference to the following detailed description of example embodiments and the accompanying drawings. The present inventive concepts may, however, be embodied in many different forms and should not be construed as being limited to the example embodiments set forth herein. Rather, these example embodiments are provided so that this disclosure will be thorough and complete and will fully convey present inventive concepts to those skilled in the art, and present inventive concepts will only be defined by the appended claim(s). Like reference numerals refer to like elements throughout the specification.

Embodiments according to the present invention can provide wireless headphones (such as earbuds and other devices) that work within an experiential eco-system that is configured to promote a "heads-up" approach to usage by reducing the user's reliance on a mobile device (such as a mobile telephone) for control of those experiences through use of an AI deployed either on a local device such as the wireless headphones and/or in cloud environment.

FIG. 1 is a schematic diagram of an experiential eco-system 1 utilizing true wireless loudspeakers in some embodiments according to the invention. The eco-system 1 can include first true wireless loudspeaker (or earbud) 2 and second true wireless loudspeaker (or, earbud) 3 that are wirelessly coupled to a wireless electronic device 150 (sometimes referred to herein as a mobile phone) which can serve as an audio source to, for example, stream music to the wireless earbuds 1 and 2. It will be understood that the earbuds 2 and 3 can also provide user input wirelessly to the mobile phone 150 to control operations thereof and to an experiential application 151 that can execute on the mobile phone 150. Accordingly, the earbuds 2 and 3 can each include a respective transceiver to provide the wireless communications to/from the mobile phone 150 as well as between the first and second earbuds 2 and 3.

As further shown, in FIG. 1, the mobile phone 150 can wirelessly communicate with a telecommunications network 152 that is coupled to the Internet 153 to provide voice and data services to the mobile phone 150 including the experiential application 151. It will be understood that the Internet 153 can provide services and data (as part of a cloud based portion of the experiential system 1) to the application 151 upon request as well as "push" data to the application 151 in response to context information associated with the user. The mobile phone 150 can also be operatively coupled to a GPS system 160 which can provide data to derive a position for the user. In some embodiments, the context data for the experiential application 151 can be provided by voice input from the user, location data provided by the mobile phone 150, biometric data from the earbuds 2 and 3, calendar data associated with the user and the like.

As further shown in FIG. 1 the experiential system 1 can also include a wearable electronic device 100 that can be wirelessly coupled to the mobile phone 150 as well as to the earbuds 2 and 3. In some embodiments, the wearable electronic device 100 can be a bracelet although other form-factors are also within the scope of the present invention. Accordingly, the bracelet 100 can include wireless transceivers to provide communications with the earbuds, mobile phone and, in some embodiments, the telecommunications network 152 such that the bracelet 100 can provide voice calls and data communications over the network 152 using the earbuds 2 and 3 either when in-ear or when coupled to the bracelet. In still further embodiments, and as described herein in further detail, the bracelet 100 can also include a rechargeable battery that can be used to charge one or both of the earbuds 2 and 3 when removeably coupled to the bracelet 100.

Accordingly, in operation the system 1 can provide an eco-system wherein the experiential application 151 and cloud-based portion can work in conjunction with one another to, based on context data, provide a curated experience to the user by instantiating selected apps without real-time user intervention to carry out services desired by the user. The services desired by the user can be provided in response to voice or other input from the user (such as a touch or gesture to an earbud or the bracelet 100) or by an AI that operates on the headphones or in the cloud portion of the system, on a component (such as the bracelet or mobile phone) or a combination of components included in both the cloud and the local system. Accordingly, the system 1 can push data to the user or respond to input from the user (or a combination of both).

Figure 2:
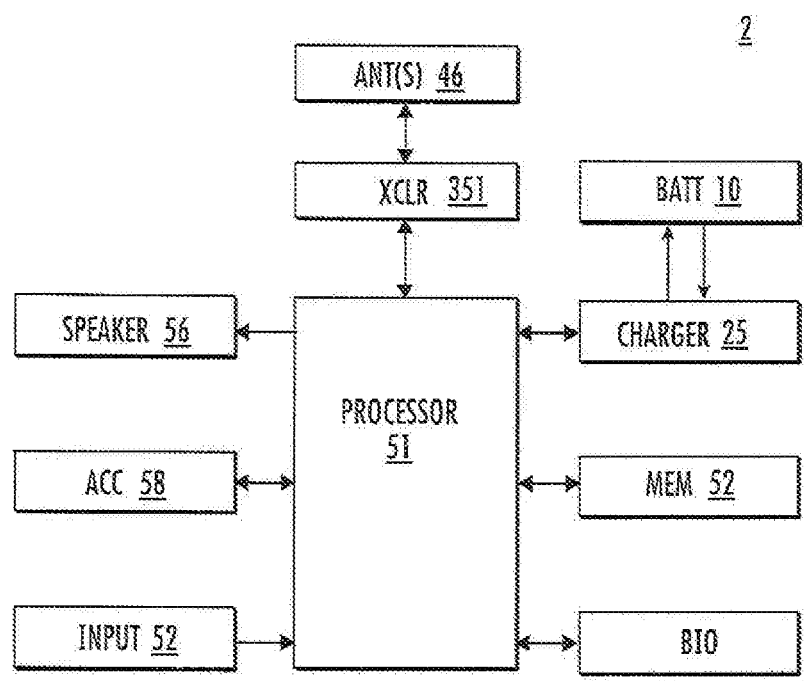
FIG. 2 block diagram of true wireless headphones in some embodiments according to the invention.

FIG. 2 block diagram of true wireless earbud 2 in some embodiments according to the invention. According to FIG. 2, earbud 2 may include a re-chargeable battery 10 that can be decoupled from a main portion of the earbud 2 for charging by the bracelet 100. The battery 10 can be encoded with data such as serial numbers etc. that can be used to determine what content the user is authorized to access or what services are enabled for the user.

The earbud may include a user interface 52 (i.e. a motion or gesture detection or button—such as "hotkey" as described in U.S. Ser. No. 15/628,206, entitled Audio/Video Wearable Computer System with Integrated Projector filed in the U.S. Patent and Trademark Office on Jun. 20, 2017, or voice input), a processor (e.g., processor circuit) 51, a memory 53, a charging connector/circuitry 25, and at least one battery 110 that is connected to the charging connector/circuitry 25. Additionally or alternatively, the charging connector/circuitry 25 may include wireless charging circuitry that is configured to wirelessly (e.g., via inductive coupling) charge the battery 10. Moreover, the earbud may optionally include one or more antennas 46, one or more transceivers (e.g., one or more transceiver circuits) 35, a speaker 56, one or more motion sensors 58 (e.g., gyroscopes, accelerometers or other motion sensors), and/or a microphone 50. The antenna(s) 46 and transceiver(s) 35 may provide short-range radio communications (e.g., Wi-Fi, Bluetooth, etc.), or other wireless communications described herein. The earbud 2 can also include one or more biosensors configured to provide biological data of the user to the processor 51 and the experiential system 1.

A transmitter portion of the short-range radio transceiver(s) 35 may convert information, which is to be transmitted by the bracelet 100, into electromagnetic signals suitable for radio communications. A receiver portion of the short-range radio transceiver(s) 35 may demodulate electromagnetic signals, which are received by the bracelet 100 to provide information contained in the signals in a format understandable to the processor 51 and/or a user of the bracelet 100.

The bracelet 100 is not limited to any particular combination/arrangement of the user interface 52. For example, the user interface 352 may be an input interface that accepts inputs (e.g., touch, motion, proximity, or processes voice input via the mic 50) from a user.

Referring still to FIG. 2, the memory 53 can store computer program instructions that, when executed by the processor circuit 51, carry out operations of the earbuds. As an example, the memory 53 can be non-volatile memory, such as a flash memory, that retains the stored data while power is removed from the memory 353. In some embodiments, the memory 53 can store audio data (such as music) and personal data of the user (such as schedule or bio related data, preferences).

In operation, each of the earbuds can connect to the mobile phone 150 using separate communications channels. For example, a selected one of the earbuds can connect using A2DP, whereas the other earbud can receive audio data from the earbud that connects using A2DP. Still further, the second earbud may connect separately to the app 151. In some embodiments, the second earbud can be configured to interface to the AI that operates as part of the experiential system whereas the first earbud can be used to control the flow of audio data from the mobile phone 150.

Figure 3:
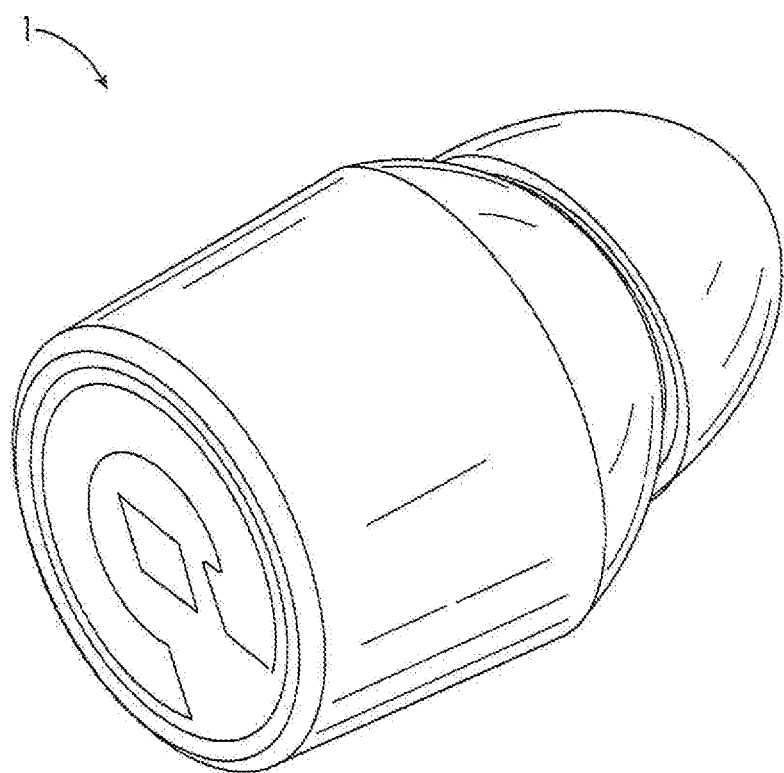
FIG. 3 is a perspective view of a true wireless earbud in some embodiments according to the invention.
Figure 4:
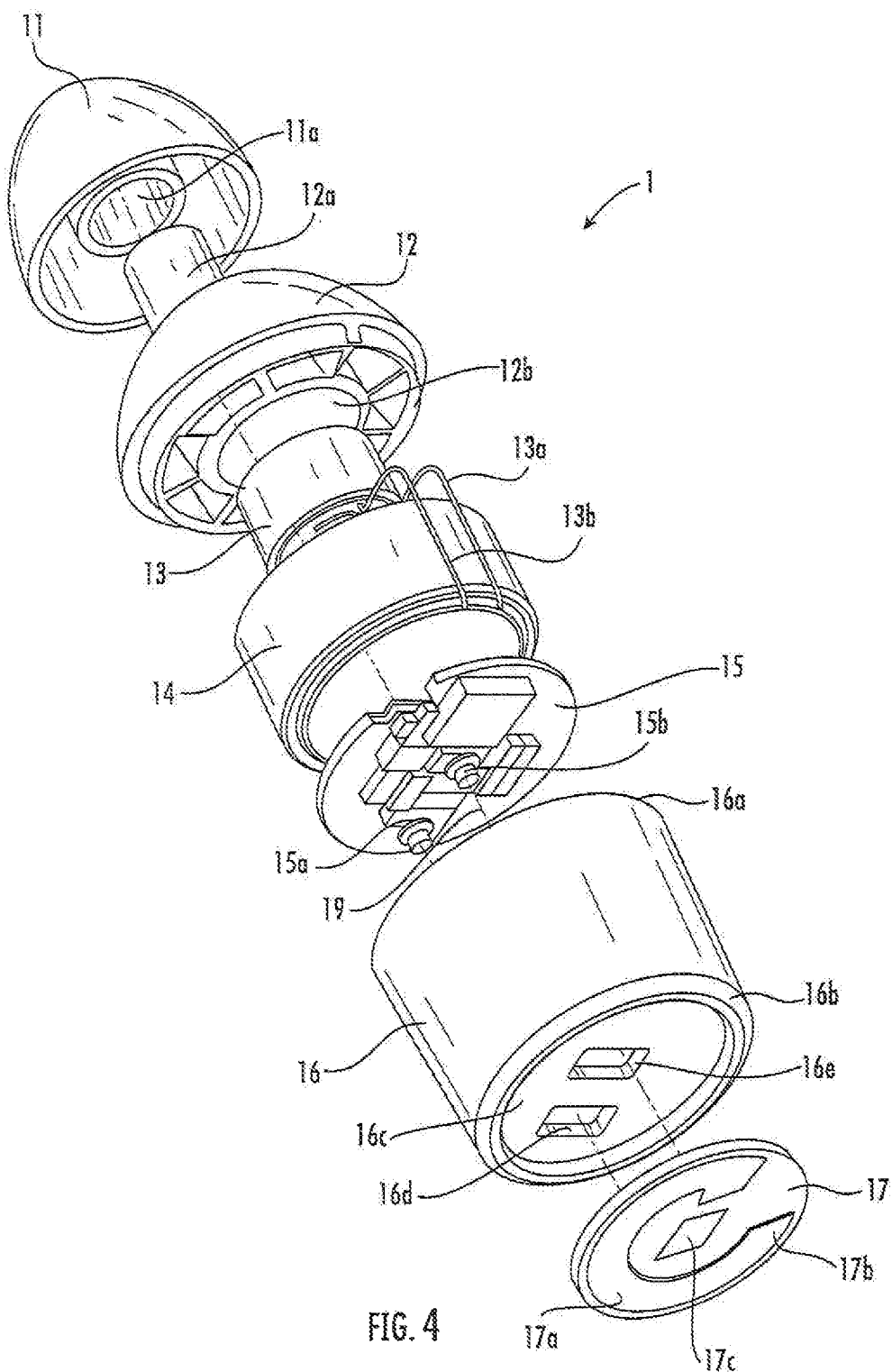
FIGS. 4 and 5 are exploded views of true wireless earbuds in some embodiments according to the invention.
Figure 5:
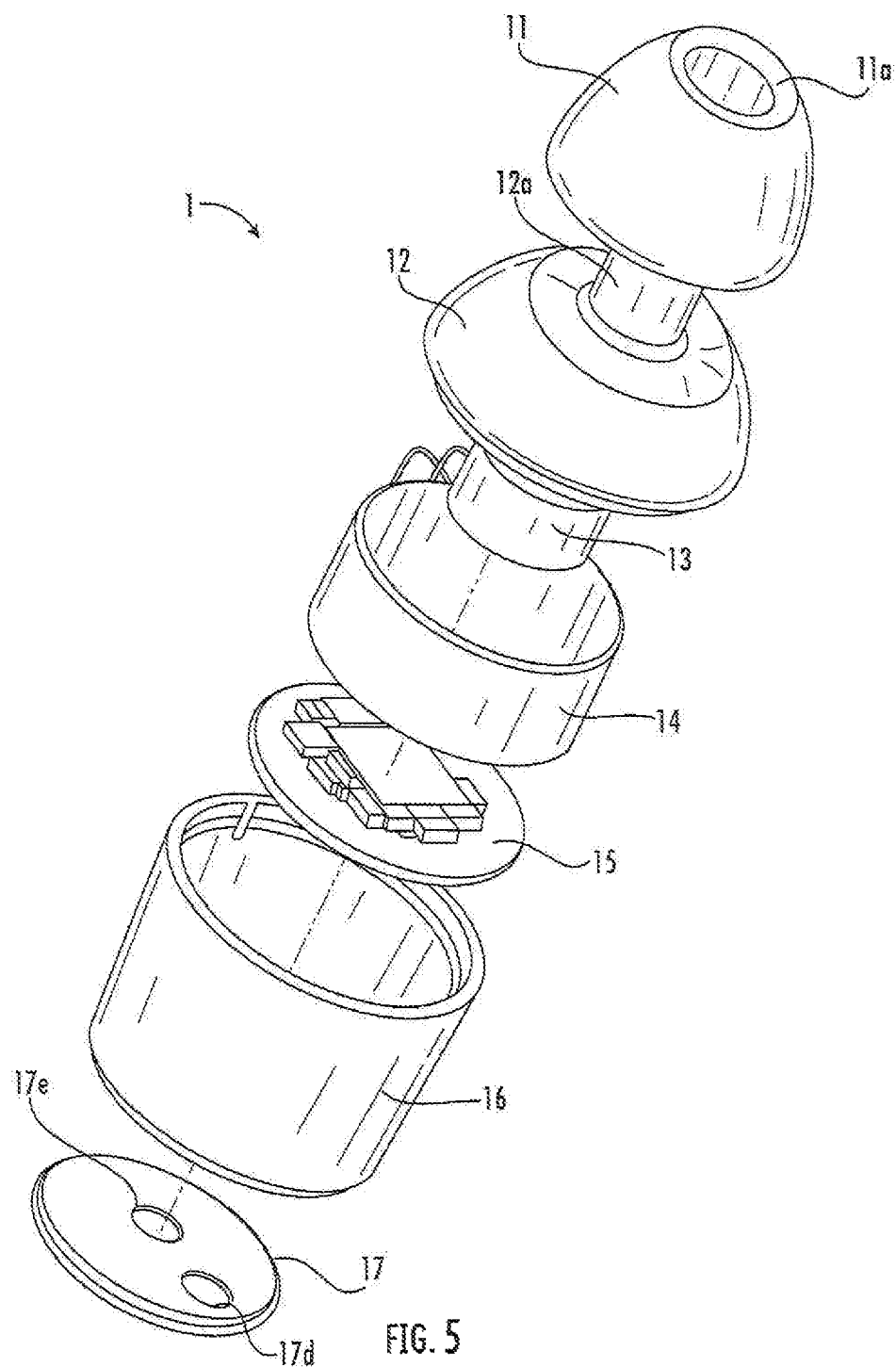

FIGS. 3 to 5 show the wireless earbud 1 in schematic isometric and exploded views. Even though shown in isolation, the earbud 1 will typically be used together with a second earbud to form a pair of earbuds, like the earbud pair 1. One of the earbuds may then be used for playing left-channel stereo audio into one ear of the user, whereas the other earbud will be used for playing right-channel stereo audio into the other ear. For the illustrated embodiment, the principal components of the wireless earbud 1 are as follows.

The earbud 1 comprises an earbud housing 12, 16 having a longitudinal main axis 19 and an essentially circular cross section. The earbud 1 further comprises a loudspeaker element 13, a rechargeable battery 14 and at least one main printed circuit board 15 having disposed thereon circuitry for wireless radio communication, audio codec and earbud operation control. The main printed circuit board 15 and its circuitry will be described in more detail later with reference to the remaining drawings.

Moreover, the wireless earbud 1 comprises a charging interface member 17. As seen in FIGS. 4 and 5, the loudspeaker element 13, the rechargeable battery 14, the main printed circuit board 15 and the charging interface member 17 are arranged in a successive order along the longitudinal main axis of the earbud housing 12, 16. More specifically, in this embodiment, the loudspeaker element 13, the rechargeable battery 14, the main printed circuit board 15 and the charging interface member 17 can all have a generally circular cross section and can be coaxially disposed around the longitudinal main axis 19 of the earbud housing 12, 16.

The earbud housing comprises a tapered front housing portion 12 and a rear housing portion 16. The tapered front housing portion 12 comprises a loudspeaker chamber 12b for accommodating the loudspeaker element 13. Further, the tapered front housing portion 12 comprises a sound guiding channel forming element 12a for receiving an earbud foam tip 11 by threading a flexible hollow engagement portion 11a thereof onto the sound guiding channel forming element 12a. Preferably, the frictional engagement between the sound guiding channel forming element 12a and the foam tip 11 is designed to be firm but yet possible to interrupt. This will make sure that the foam tip 11 stays in place during normal use but may be removed for replacement by another foam tip for reasons of wear and tear or user preference.

The loudspeaker element 13 is operatively connected to the audio codec circuitry on the main printed circuit board 15 via two connecting wires 13a, 13b. Using a balanced armature receiver for the loudspeaker element 13 is advantageous, since it offers high audio performance at a small physical size.

The rear housing portion 16 can be essentially cylindrical or frusto-conical shaped. The rear housing portion 16 comprises a first end 16a proximate to the front housing portion 12, and a second distal end 16b. Together with the front housing portion 12, the rear housing portion 16 accommodates the main printed circuit board 15 inside the rear housing portion 16 nearest its second distal end 16b, then the rechargeable battery 14 and the loudspeaker element 13 in successive order towards the front housing portion 12 along the longitudinal main axis 19 of the earbud housing.

The rear housing portion 16 has a wall 16c at the second distal end 16b. The main printed circuit board 15 is mounted at an internal surface of the wall 16c. Moreover, the charging interface member 17 is mounted at an external surface of the wall 16c in a shallow protective recess formed by the wall 16c and the surrounding parts of the second distal end 16b of the rear housing portion 16.

As seen in FIG. 4, the wall 16c comprises first and second openings 16d, 16e for providing access from the outside of the wall to the main printed circuit board 15 inside the wall 16c, i.e. inside the earbud housing.

Hence, the main printed circuit board 15 has mounted thereon first and second charging connectors 15a, 15b which are aligned with the first and second openings 16d, 16e in the wall 16c to provide electric contact with the charging interface member 17 at the external surface of the wall 16c through contact areas 17d, 17e (FIG. 5). As shown, the charging connectors 15a, 15b are elongated resilient members, such as pogo pins, which protrude partly through the first and second openings 16d, 16e in the wall 16c. In other embodiments, elongated resilient connecting members may protrude from the charging interface member 17 through the first and second openings 16d, 16e in the wall 16c to the main printed circuit board 15.

As shown, the charging interface member 17 comprises a circuit board substrate which is mounted to the external surface of the wall 16c of the rear housing portion 16. A conductive pattern 17a is printed on the external surface of the circuit board substrate, i.e. the surface which faces away from the wall 16c. The conductive pattern is designed for electric contact with a power transmission arrangement in a storage and charging capsule for the wireless earbud, typically the storage and charging capsule 20 previously described with reference to FIGS. 1 to 4.

The conductive pattern 17a on the charging interface member 17 (i.e. circuit board substrate) comprises a first sub-pattern 17b adapted to reach electrical contact with a first charging connector element of the power transmission arrangement. The conductive pattern 17a also comprises a second sub-pattern 17c electrically isolated from the first sub-pattern 17b and being adapted to reach electrical contact with a second charging connector element of the power transmission arrangement.

Advantageously, the conductive pattern 17a may be designed as a graphical symbol representing the individual earbud 1, a product type of the earbud 1, or a producer or supplier of the earbud 1. Such a graphical symbol may convey technical or commercial information pertaining to the individual earbud 1, its product type, or its producer or supplier.

As already indicated, in the disclosed embodiment, the first and second openings 16d, 16e in the wall 16c of the rear housing portion 16 of the earbud 1 are aligned with a programming or data writing interface on the main printed circuit board 15. The probes or electrodes may access the programming or data writing interface on the main printed circuit board 15 to fill memories and registers thereof with software or firmware instructions, and/or data. Such a procedure is commonly referred to as "flashing" (of flash memories). In one embodiment, the earbuds 10a and 10b are paired with each other by writing the Bluetooth address of the first wireless earbud 1a into a memory or register of the second wireless earbud, and vice versa.

The main circuit board 15 can also include the circuitry for wireless radio communication, audio codec and earbud operation control and the other systems shown in FIG. 2 including the motion sensors. Other circuitry may also be included on the main circuit board 15.

Earbud operation control may include general control of the wireless radio communication e.g. for establishing, maintaining and communicating over the wireless communications shown in FIG. 1 such as (without limitation) GSM, UMTS, LTE, LTE Advanced, D-AMPS, CDMA2000, FOMA or TD-SCDMA, and/or to a data communication network, such as the Internet 153. Earbud operation control may also include power management for receiving power from the rechargeable battery 14 and for charging the rechargeable battery 14.

Each earbud 2 and 3 can include a motion sensor, such as an accelerometer as shown in FIG. 2. The accelerometers are configured to provide acceleration information representative of acceleration of the respective earbud. The acceleration information from both accelerometers can be used together to provide information representative of angular motion of the head of the user in a generally horizontal plane relative to a user who is standing or sitting generally upright, e.g., such that the neck and spine that support the user's head are generally vertical. The mobile phone 150 or bracelet 100 can discriminate between acceleration in a generally horizontal plane and directions other than in a generally horizontal plane, e.g., those occurring on account of nodding the head forward or backward, tilting the head to a side, or the body of the user leaning or bending. Such discrimination may be based on the sign or polarity of the signals from the respective accelerometers and/or the normalized signals obtained from the acceleration signals produced by the accelerometers and/or from the curve shapes of the acceleration signals from both accelerometers. For example, similar curve shape, but opposite polarity tends to indicate that the acceleration signals are representing angular motion in the generally horizontal plane.

In particular, the data from the acceleration signals can be used to determine which earbud is in the users left ear and which earbud is in the user's right ear. For example, the acceleration signals can determine the locations based on movement of the user's head combined with a general model of a user's head to distinguish forward vs. rear direction which can be then used to determine left vs. right placement. In some embodiments, the mobile phone 150 or bracelet 100 can sound a tone in each earbud and the user can touch the earbud that the user wishes to designate with a particular function (such as the interface to the audio control via the mobile phone 150 vs. the interface to the audio AI. In particular, the mobile phone 150 or bracelet 100 can use the motion sensor data to detect the touch. In still other embodiments, no tone may be generated.

Figure 6:
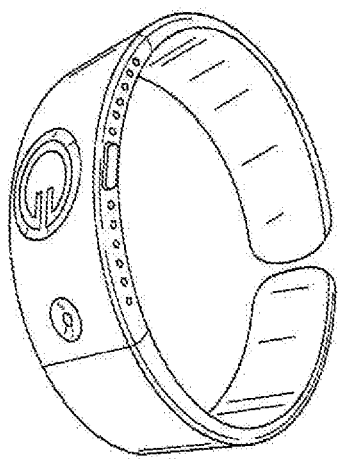
FIGS. 6-8 are views of a bracelet having the true wireless earbuds coupled thereto for charging in some embodiments according to the invention.
Figure 7:
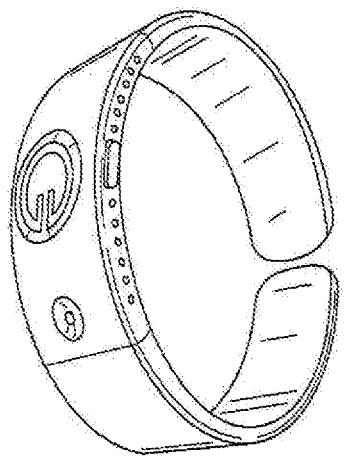
Figure 8:
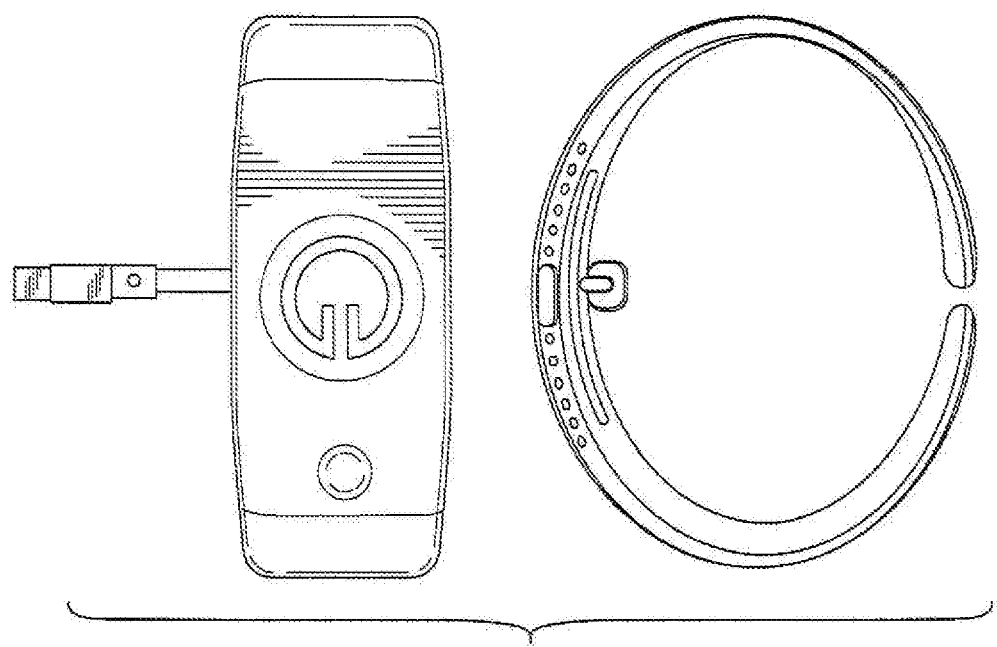
Figure 9:
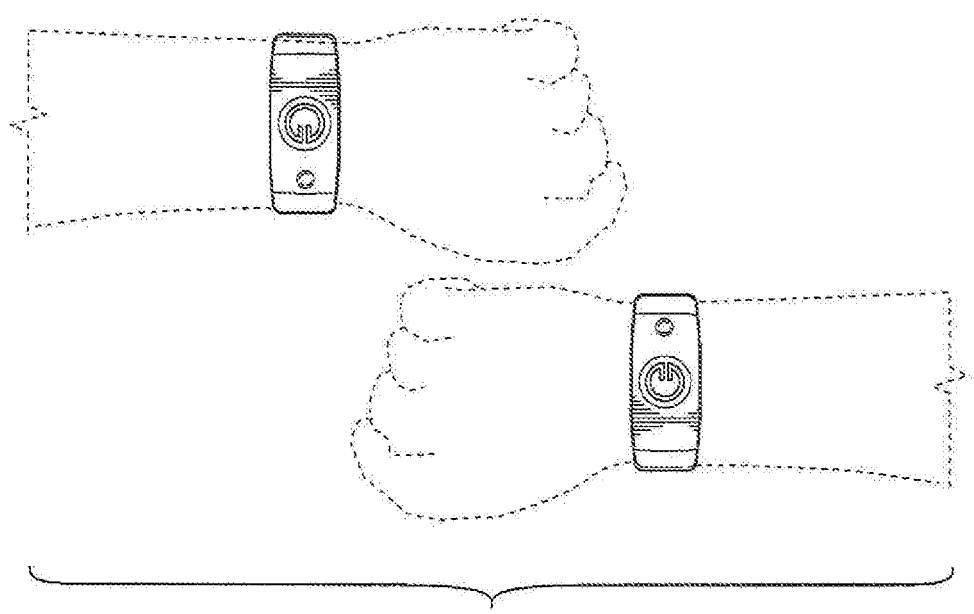
FIG. 9 is a view of the bracelet having the true wireless earbuds coupled thereto for charging worn by a user in some embodiments according to the invention.

In other embodiments, the system may include a "band" or "bracelet," for example, as shown in FIGS. 6, 7, and 8 and shown in position on a user in FIG. 9. The band or bracelet may include a battery that may be used to charge a smartphone or tablet. The band may include a volume control.

In some embodiments, the bracelet may detect hand signals or motions while being worn. In some embodiments, the hand signals or motions performed while wearing the band or bracelet may be used in gaming, wherein the hand signals or motions while wearing the band or bracelet may mimic striking an object or virtual object, or controlling an augmented reality projection. A controller may also be used in conjunction with the system as input for gaming, mimic striking an object or a virtual object, or controlling an augmented reality projection.

The system band or bracelet may be used to control various devices, for example, but not limited to, a smartphone, a TV, a tablet, and the like, in the possession or control of the user. The control of these devices may be motion activated, or voice activated. Still further, the bracelet can be used to provide controls for the earbuds, which in-turn can activate the same types of services that can be request by direct input to the earbuds (for example, touch, gesture, voice or the like).

The system band or bracelet may also connect the user to all of the apps, social media, e-mail, messages, available to the user through phone or tablet with a bot based voice assistant that can notify the user ahead of time with reminders for appointments, events, and the like.

In some embodiments, the band or bracelet may be connected to any screen or display or TV at the disposal of the user, with either a built in or removable HDMI dongle that plugs into the display or TV, thus permitting access to a smartphone or tablet of the user through the TV.

The band or bracelet may be used to sync, via Bluetooth or WiFi, to any device of the user, such as a car, a TV, etc., to have access to the smartphone of the user via "the cloud."

The band or bracelet may be used to make hands-free phone calls and to send messages, for example, SMS or MMS messages.

In other embodiments, the voice based bot assistant associated with the band or bracelet may be used to communicate to the user recording, for example, information related to items or products, such as price or reviews retrieved related to a specific item or product, when queried by the user. In other embodiments, the band or bracelet may be used to transfer information, for example, contact information and the like, of the user to another user that has a band or bracelet of the invention.

In other embodiments, the band or bracelet may be used to connect to MIDI and light controls at an event, for example, a concert, to activate lights in sync with the show, or used by one friend to locate another in a crowd with, for example, blinking lights.

In other embodiments, the band or bracelet may be capable of measuring health information of the user, and provide the information audibly to the user. Additionally, the band or bracelet may be able to notify emergency services in case of an accident, or medical emergency, and be able to measure data regarding the event, such as motion, location, and the like. The band or bracelet may also be used to call authorities, such as the police and law enforcement, in the case of an emergency.

Multiple bracelets may be synced together to play music. Voice recognition may be used by the band or bracelet for security of access and to unlock the band or bracelet for access by the user.

In some embodiments according to the invention, the bracelet can include infrastructure for communications such as an access point (i.e. such as a 4G LTE interface to a communication cellular network). In still further embodiments according to the invention, the bracelet can be tethered to another device wherein the communications infrastructure can be used to connect the tethered device to the cellular communications network. In still further embodiments according to the invention, the bracelet can be tethered to another device such as a speaker, headphone, or other mobile electronic device to provide live video or audio transition to the cellular communication network. In still further embodiments according to the invention, the bracelet can have a variable charged capacity (i.e. mAh) and still further can include a subsystem to provide wireless charging to a connected device. In still further embodiments according to the invention, the bracelet can be hermetically sealed to provide a water resistant device.

Figure 10:
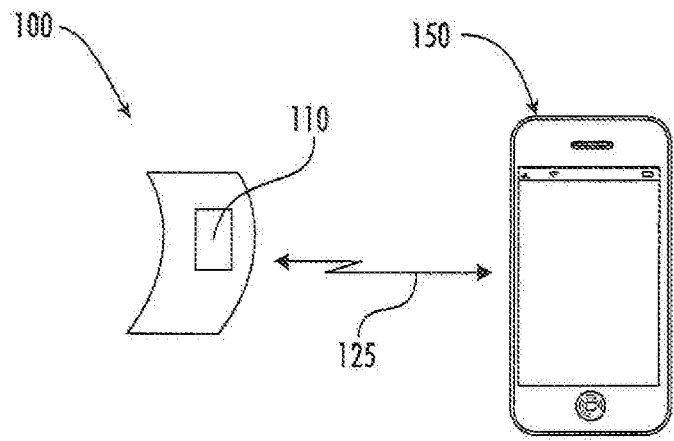
FIGS. 10-11 are schematic views of a bracelet coupled to a mobile device for charging in some embodiments according to the invention.

Referring now to FIG. 10, a wearable electronic device, such as a bracelet, 100 may include a battery 110 that can be used to charge a portable, wireless electronic device 150. The wearable electronic device 100 may be a smart watch or any other type of smart band. Examples of the portable, wireless electronic device 150 include a mobile telephone, a tablet computer, a laptop computer, a portable music player, wireless headphones, or a wireless speaker. By connecting the portable, wireless electronic device 150 to the wearable electronic device 100 via a charging link/connection 125, the battery 110 of the wearable electronic device 100 may charge (e.g., re-charge) a battery 460 (illustrated in FIG. 10) of the portable, wireless electronic device 150.

The charging link/connection 125 between the wearable electronic device 100 and the portable, wireless electronic device 150 may be a wireless connection/link or a wired connection/link. For example, the charging link/connection 125 may be provided by a cable that is an integrated/built-in component of the wearable electronic device 100. Alternatively, the charging link/connection 125 may be a wireless charging connection/link such as inductive coupling.

Figure 11:
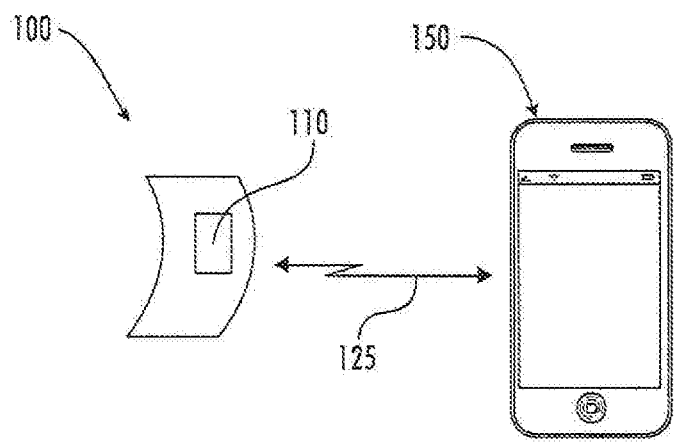

Referring now to FIG. 11, the wearable electronic device 100 is illustrated with a charging cable (i.e., a wired connector) 225 that, according to some embodiments, provides the charging link/connection 125. The charging cable 225 may be an integrated/built-in component of the wearable electronic device 100 that includes a plug/end (e.g., a "male plug") that plugs into a charging port 250 of the portable, wireless electronic device 150. For example, the charging cable 225 may be a Universal Serial Bus (USB) cable or a non-USB cable such as a Lightning® connector. Moreover, although the charging cable 225 is illustrated as extending from a side surface or an underside of the wearable electronic device 100, the present inventive entity appreciates that the charging cable 225 may be permanently attached to extend from various regions (e.g., the top surface) of the wearable electronic device 100. The present inventive entity also appreciates that although the charging port 250 is illustrated on a bottom end of the portable, wireless electronic device 150, the charging port 250 may alternatively be on a top end or side portion/edge of the portable, wireless electronic device 150.

In some embodiments, the wearable electronic device 100 may include a housing/recess for storing the charging cable 225 so that the charging cable 225 does not protrude from the wearable electronic device 100. As an alternative to the built-in charging cable 225, the wearable electronic device 100 may include a port (e.g., a port analogous to the charging port 250) into which a removable charging cable can be inserted and then connected to the charging port 250 of the portable, wireless electronic device 150. Moreover, in some embodiments, the wearable electronic device 100 may include circuitry configured to wirelessly transfer power to a charging cable/dongle that receives wireless power and that is connected to the charging port 250 of the portable, wireless electronic device 150.

The wearable electronic device 100 may, in some embodiments, include an integrated stand that a user can deploy when charging the portable, wireless electronic device 150. For example, the integrated stand may maintain the position of the wearable electronic device 100 so that a charging connector/circuitry 325 (illustrated in FIG. 12) and/or a speaker 356 (illustrated in FIG. 12) faces a particular direction. Accordingly, the integrated stand may stabilize the wearable electronic device 100 to keep it from rolling on a surface, and/or falling off of the surface, and/or to improve the quality of sound from the speaker 356, when the charging link/connection 125 is in use.

Referring again to FIGS. 10 and 11, the battery 110 may be a primary battery or a secondary battery of the wearable electronic device 100. Accordingly, in some embodiments, the wearable electronic device 100 may have more than one battery. Alternatively, the battery 110 may be the sole battery of the wearable electronic device 100.

Figure 12:
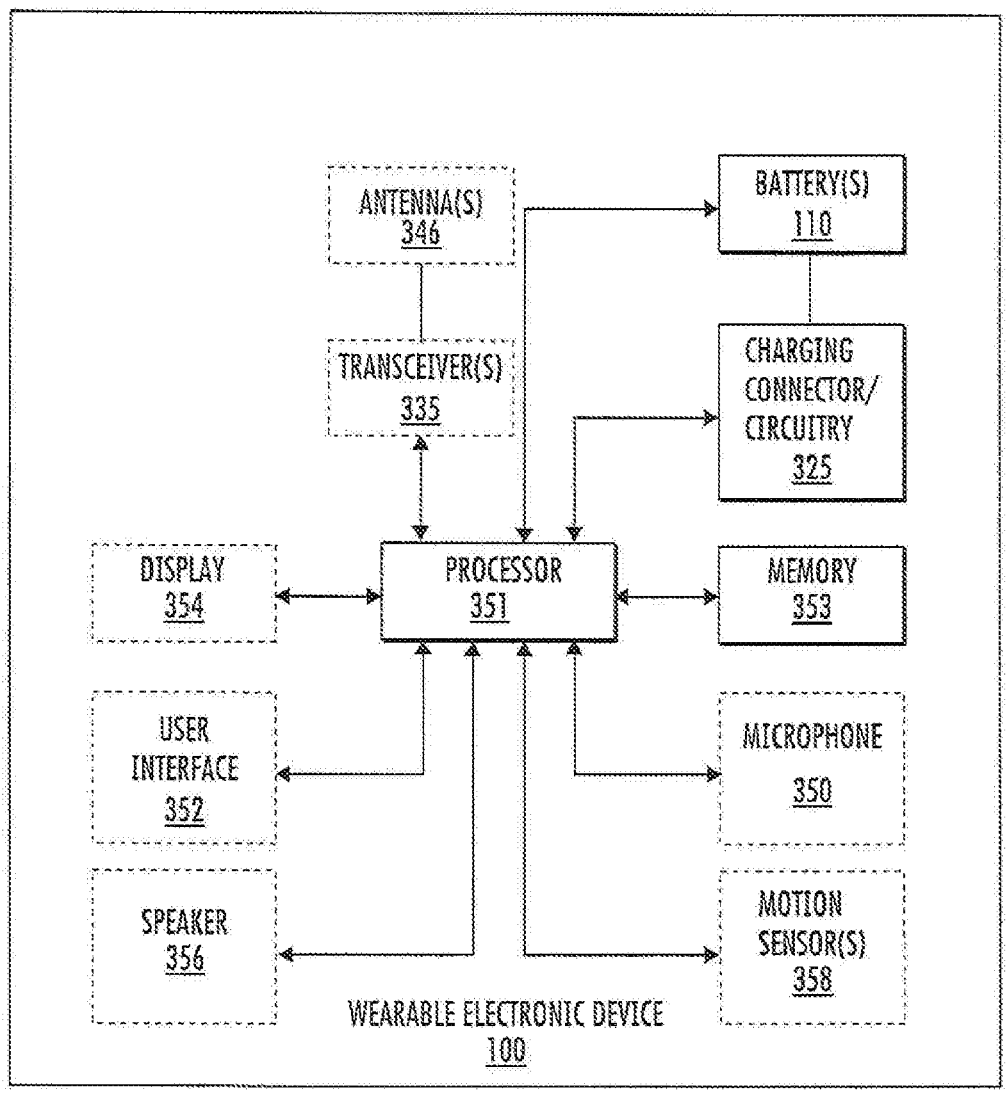
FIG. 12 is a block diagram of a wearable electronic device or bracelet in some embodiments according to the invention.

Referring now to FIG. 12, a block diagram of the wearable electronic device 100 of FIG. 10 is provided, according to various embodiments of present inventive concepts. As illustrated in FIG. 12, the wearable electronic device 100 may include a user interface 352, a processor (e.g., processor circuit) 351, a memory 353, a charging connector/circuitry 325, and at least one battery 110 that is connected to the charging connector/circuitry 325. In some embodiments, the charging connector/circuitry 325 may include the charging cable 225. Additionally or alternatively, the charging connector/circuitry 325 may include wireless charging circuitry that is configured to wirelessly (e.g., via inductive coupling) charge the battery 460 of the portable, wireless electronic device 150. Moreover, the wearable electronic device 100 may optionally include one or more antennas 346, one or more transceivers (e.g., one or more transceiver circuits) 335, a speaker 356, a display, one or more motion sensors 358 (e.g., gyroscopes or other motion sensors), and/or a microphone 350. The antenna(s) 346 and transceiver(s) 335 may provide short-range radio communications (e.g., Wi-Fi, Bluetooth, etc.), or other wireless communications, with the portable, wireless electronic device 150.

A transmitter portion of the short-range radio transceiver(s) 335 may convert information, which is to be transmitted by the wearable electronic device 100, into electromagnetic signals suitable for radio communications (e.g., to the portable, wireless electronic device 150). A receiver portion of the short-range radio transceiver(s) 335 may demodulate electromagnetic signals, which are received by the wearable electronic device 100 from the portable, wireless electronic device 150, to provide information contained in the signals in a format understandable to the processor 351 and/or a user of the wearable electronic device 100.

The wearable electronic device 100 is not limited to any particular combination/arrangement of the user interface 352 and the display 354. For example, the user interface 352 may be an input interface that accepts inputs (e.g., touch, click, motion, proximity, or keypad inputs) from a user. Moreover, the display 354 may be referred to as a user interface that provides graphical/visual outputs to the user. In some embodiments, the functions of the user interface 352 and the display 354 may optionally be provided by a touch screen through which the user can view information, such as computer-displayable text and/or images, provide input thereto, and otherwise control the wearable electronic device 100. Additionally or alternatively, the wearable electronic device 100 may include a separate user interface 352 and display 354. For example, user input may be accepted through a touchpad or another user input interface that is separate from the display 354.

Referring still to FIG. 12, the memory 353 can store computer program instructions that, when executed by the processor circuit 351, carry out operations of the wearable electronic device 100 (e.g., operations of communicating with and/or charging the portable, wireless electronic device 150). As an example, the memory 353 can be non-volatile memory, such as a flash memory, that retains the stored data while power is removed from the memory 353.

Figure 13:
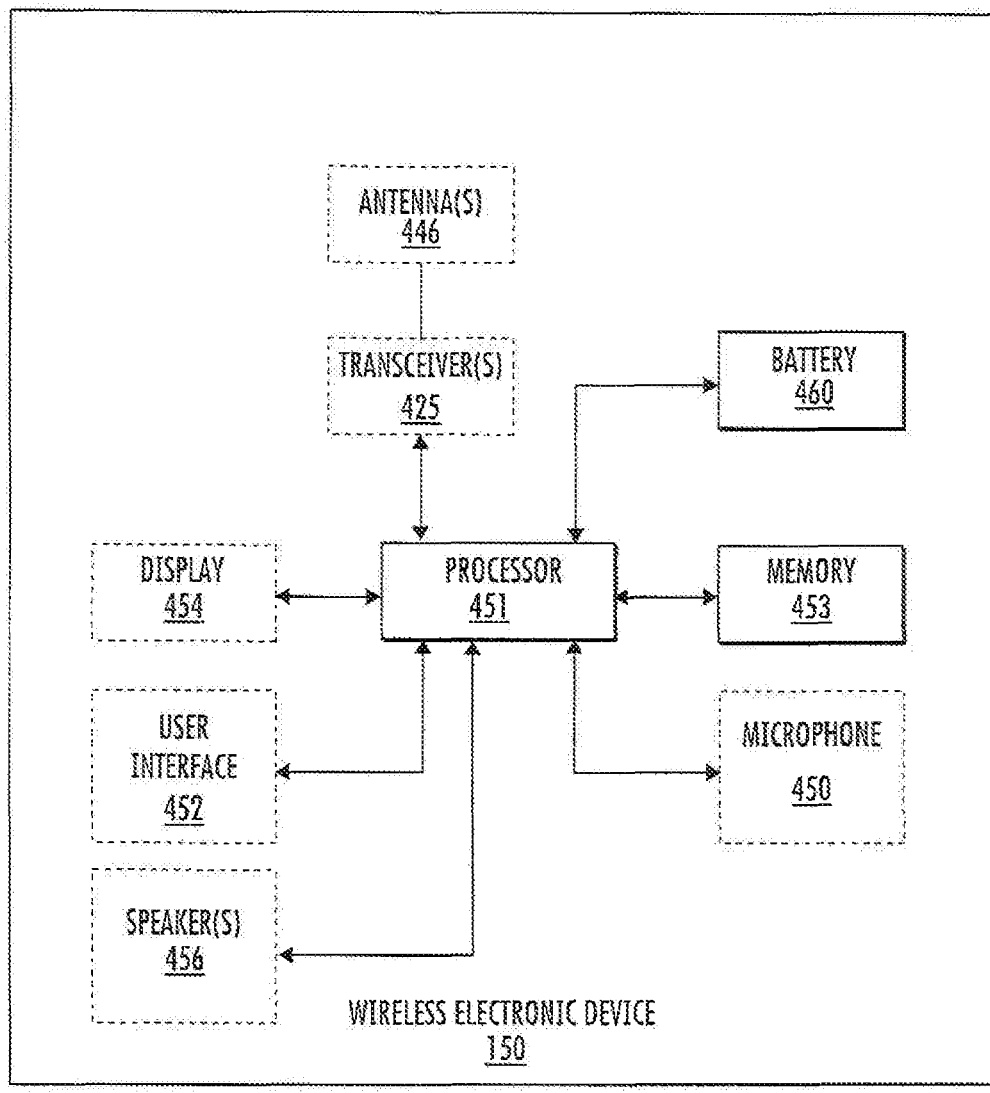
FIG. 13 is a block diagram of a mobile device in some embodiments according to the invention.

Referring now to FIG. 13, a block diagram of the portable, wireless electronic device 150 of FIG. 10 is provided, according to various embodiments of present inventive concepts. As illustrated FIG. 13, the portable, wireless electronic device 150 may include the battery 460, a processor 451, a memory 453, a user interface 452, and at least one speaker 456. Moreover, the portable, wireless electronic device 150 may optionally include antenna(s) 446 and transceiver(s) 425, a display 454, and a microphone 450. Detailed descriptions of elements of the portable, wireless electronic device 150 that are similar to elements described herein regarding the wearable electronic device 100 may be omitted.

Figure 14:
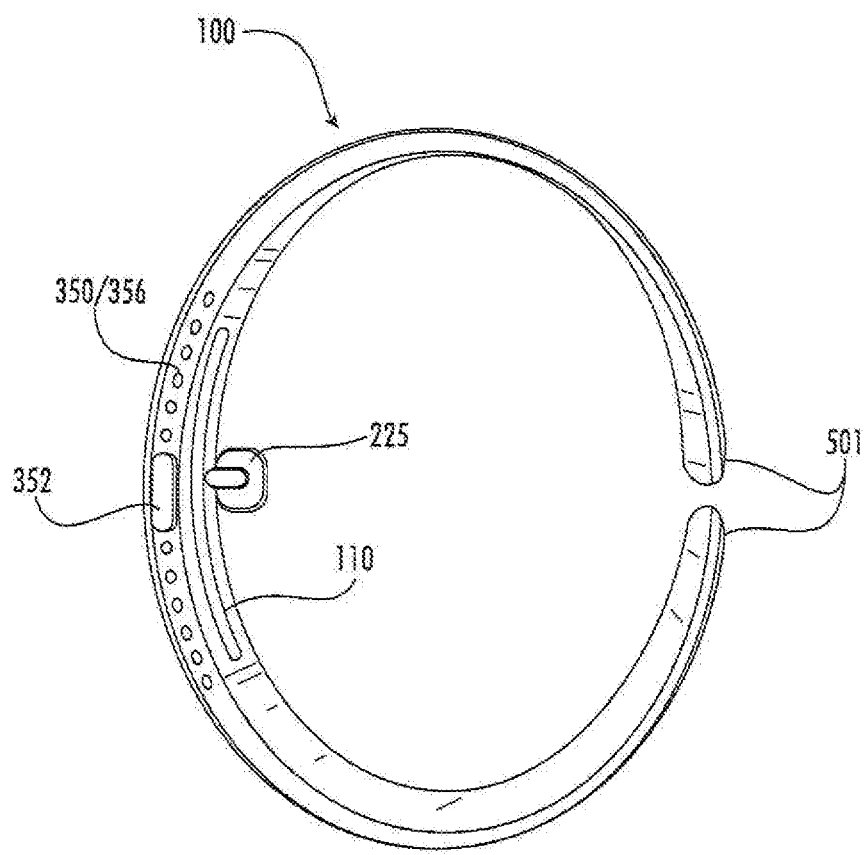
FIG. 14 is a side view of a wearable electronic device or bracelet in some embodiments according to the invention.

Referring now to FIG. 14, a side view of the wearable electronic device 100 is illustrated. As illustrated by FIG. 14, a side surface of the wearable electronic device 100 may include a microphone 350 and/or a speaker 356. Additionally or alternatively, the side surface of the wearable electronic device 100 may include a user interface 352 such as a button that a user can use to turn off/on the wearable electronic device 100 or to control other functions of the wearable electronic device 100.

Moreover, FIG. 14 illustrates that the charging cable 225 may be permanently fixed to a portion of the wearable electronic device 100. For example, the charging cable 225 may be permanently fixed to a side portion or an underside portion of the wearable electronic device 100. The present inventive entity appreciates, however, that the charging cable 225 may be permanently fixed at other locations, such as a top surface, of the wearable electronic device 100. Similarly, although the battery 110 is illustrated at an underside portion of the wearable electronic device 100, the present inventive entity appreciates that the battery 110 may be located at other locations in the wearable electronic device 100.

As illustrated by FIG. 14, the wearable electronic device 100 may, in some embodiments, include a band that extends only partially around a user's limb (e.g. a user's wrist). For example, the band may extend more than half way around the wrist of the user but may still have a gap between its ends 501. Alternatively, the wearable electronic device 100 may extend continuously around the wrist of the user.

Figure 15:
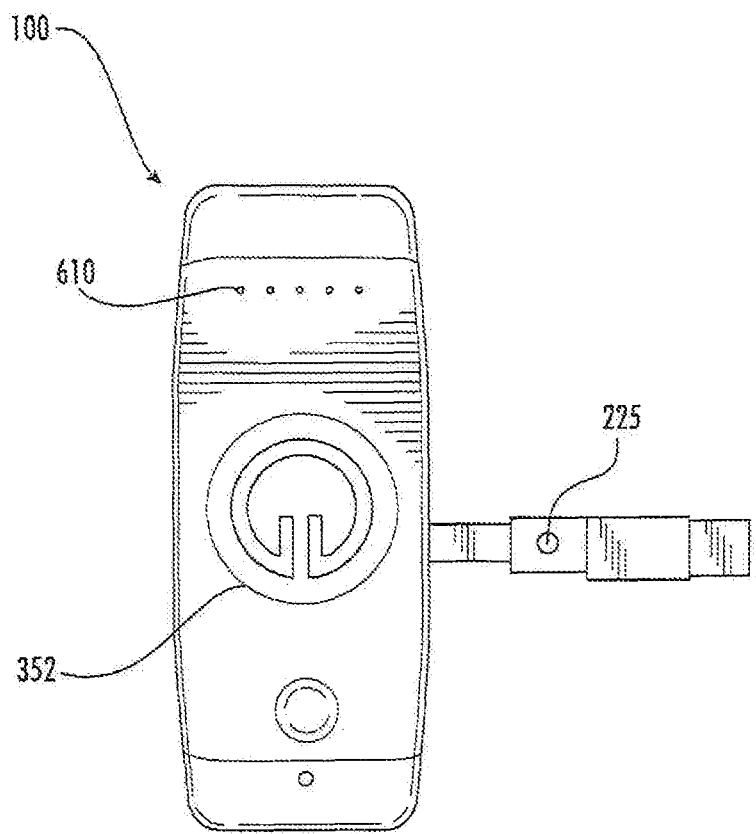
FIG. 15 is a front view of a wearable electronic device or bracelet in some embodiments according to the invention.

Referring now to FIG. 15, a top view of the wearable electronic device 100 is illustrated. As illustrated by FIG. 15, the wearable electronic device 100 may include a visual battery-life indicator 610. In some embodiments, the battery-life indicator 610 may be displayed on a display 354. Alternatively, the battery-life indicator 610 may be a standalone visual indicator of the charge of the battery(s) 110 of the wearable electronic device 100. Additionally or alternatively, the battery-life indicator 610 may visually indicate the charge of the battery 460 of the portable, wireless electronic device 150. Accordingly, the battery-life indicator 610 of the wearable electronic device 100 may indicate a battery level of at least one of the wearable electronic device 100 and the portable, wireless electronic device 150 or earbuds. The battery-life indicator 610 may thus indicate the progress of charging the portable, wireless electronic device 150 (when the wearable electronic device 100 is connected to the portable, wireless electronic device 150 via the charging link/connection 125), and/or indicate the capacity of the wearable electronic device 100 to charge the battery 460 of the portable, wireless electronic device 150.

Referring still to FIG. 15, the charging cable 225 may be extendable to connect to the portable, wireless electronic device 150. For example, the charging cable 225 may be a flexible and/or retractable cable that can be directed by a user toward the portable, wireless electronic device 150. Additionally or alternatively, a top/front surface of the wearable electronic device 100 may provide a user interface 352. In some embodiments, the user interface 352 may be combined with a display 354 to provide a touch display. Alternatively, the user interface 352 may be separate from the display 354 (or the display 354 may be omitted altogether). For example, the user interface 352 may a volume-control interface that allows the user to adjust a volume of the speaker 356 and/or the speaker(s) 456 (or a speaker of another electronic device that is communicatively coupled to one of the devices 100, 150). The volume-control interface may be a touch (and/or proximity) interface, a button, a knob, or any other user interface that allows the user to adjust audio volume.

Figure 16:
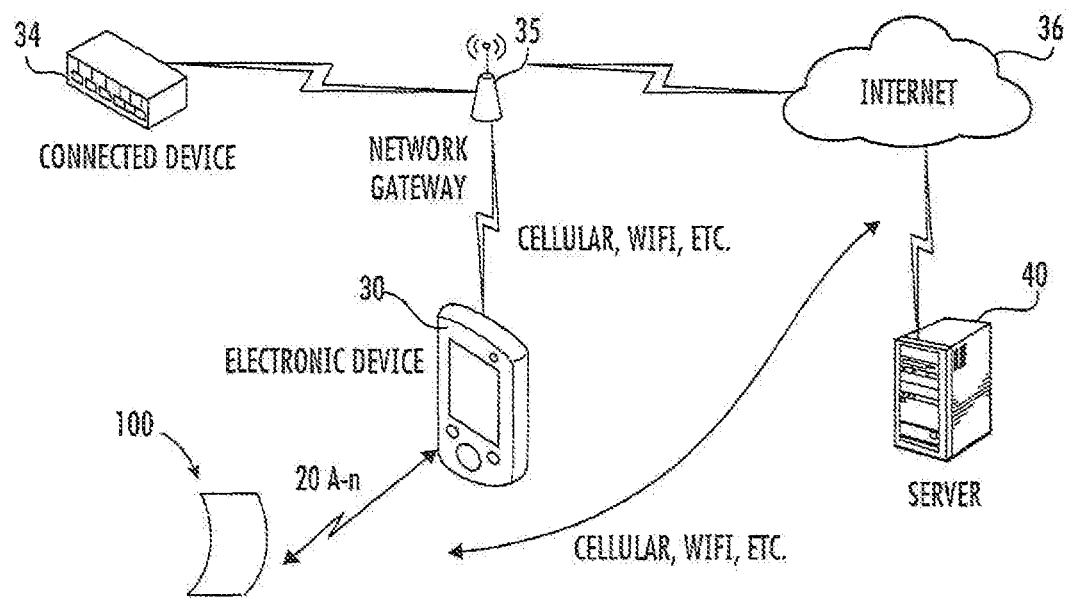
FIG. 16 is a schematic diagram of a bracelet operating in a system in some embodiments according to the invention.

Referring now to FIG. 16, the wearable electronic device 100 according to present inventive concepts is illustrated within an operating environment. As illustrated in FIG. 11, the wearable electronic device 100 may be communicatively coupled to an electronic device 30 (e.g., the portable, wireless electronic device 150) by one or more communication paths 20A-n. The communication paths 20A-n may include, for example, WiFi, USB, IEEE 1394, Bluetooth, Bluetooth Low-Energy, electrical wiring, and/or various forms of radio, though present inventive concepts are not limited thereto. The communication paths 20A-n may be used simultaneously and, in some embodiments, in coordination with one another. The wearable electronic device 100 may exchange data and/or requests withthe electronic device 30.

The electronic device 30 may be in further communication with an external server 40 through a network 36. In some embodiments, the network 36 may be a large network such as the global network that is more commonly known as the Internet. The electronic device 30 may be connected to the network 36 through intermediate gateways such as the network gateway 35. The electronic device 30 may be connected to the network gateway 35 through various means. For example, the network gateway 35 may be a radio-based telecommunication gateway, such as a base station, and the electronic device 30 may communicate with the network gateway 35 via radio communication such as that commonly used in cellular telephone networks. In some embodiments, the network gateway 35 may be a network access point, and the electronic device 30 may communicate with the network gateway 35 via a wireless network (e.g., WiFi). The network gateway 35 may further communicate with the network 36 via a communication method that is similar to or different from the one used between the electronic device 30 and the network gateway 35. The communication paths described herein are not intended to be limiting. One of skill in the art will recognize that multiple technologies can be used for connectivity between the electronic device 30 and the server 40 without deviating from present inventive concepts.

The electronic device 30 may communicate with the server 40 to exchange information, data, and or requests. In some embodiments, the electronic device 30 may share data provided by the wearable electronic device 100 with the server 40. In some embodiments, the electronic device 30 may retrieve instructions and/or data from the server 40 responsive to input received from the wearable electronic device 100.

In some embodiments, the electronic device 30 may be communicatively coupled to a connected device 34. The connected device 34 can be any connected device that supports an associated application running in an operating environment of the electronic device 30. In some embodiments, the electronic device 30 may exchange data and/or control the connected device 34 responsive to input received from the wearable electronic device 100. Though illustrated as being connected to the connected device 34 through the network gateway 35, this illustration is not intended to be limiting. In some embodiments, the electronic device 30 may directly connect to the connected device 34 via similar communication paths as discussed with respect to communications paths 20A-n. For example, a path between the electronic device 30 and the connected device 34 may include, for example, WiFi, USB, IEEE 1394, Bluetooth, Bluetooth Low-Energy, electrical wiring, and/or various forms of radio, though present inventive concepts are not limited thereto.

In some embodiments, the input received from the wearable electronic device 100 may be transmitted to the electronic device 30. The input provided by the wearable electronic device 100 may be used to interact with applications running on the electronic device 30 so as to control operations of the wearable electronic device 100, the server 40 and/or the connected device 34.

One or more processors (e.g., the processor 451) may control the overall operation of the electronic device 30. The one or more processors may be configured to receive input provided from the wearable electronic device 100 and to execute operations of a common application programming interface (API) framework responsive to that input. In some embodiments, the processor(s) accomplish this by executing software or firmware stored in memory (e.g., the memory 453). The processor(s) may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices. The API may be a cross-platform API capable of receiving input at the electronic device 30 from the wearable electronic device 100 for interaction with connected devices.

By varying the operation of applications running within an operating environment of the electronic device 30, the wearable electronic device 100 may be utilized to seamlessly control devices connected to the electronic device 30, as described herein.

Accordingly, in some embodiments, the wearable electronic device 100 may be a smart remote control band that can control one or more other electronic devices, such as the portable, wireless electronic device 150 (or an electronic device that is connected to the portable, wireless electronic device 150). For example, the wearable electronic device 100 may be used to control gaming applications or music applications for one or more electronic devices that are connected (e.g., wirelessly, communicatively coupled) to the wearable electronic device 100 and/or to the portable, wireless electronic device 150. As an example, a user of the wearable electronic device 100 may speak commands into a speaker 356, and the command will be searched with all connected software platforms (e.g., third-party applications). Moreover, in some embodiments, a user's motions of the wearable electronic device 100, as detected by motion sensor(s) 358, may be used to command the gaming applications or music applications.

Additionally or alternatively, according to various embodiments of present inventive concepts, the wearable electronic device 100 may be configured to serve as an external battery (i.e., an external power source) that charges the portable, wireless electronic device 150 (e.g., a smart phone or wireless earbuds) via the charging link/connection 125, as discussed with respect to any of FIGS. 5-10.

In still further embodiments according to the invention, a customizable artificial intelligent avatar can be selected from a library or generated based on camera input provided by a device that houses firmware to activate the artificially intelligent assistant or avatar. The device can be in the form factor of an HDMI port or USB port dongle that is pluggable into a device such as a device having a display capable of accessing the internet or a TV. In still further embodiments according to the invention, the device when plugged into the port on the TV can sample sound in a local environment using microphones mounted on the device to provide and capture 3D spatial sound from the environment provided by a user. Accordingly, when a user speaks, the device can activate firmware within that provides remote control functionality for the TV. The remote control functionality can activate an application on the TV or on a third party device (e.g. Apple TV) automatically. Activating the functionality of the TV remote allows the device to control the TV as if via a conventional remote control. In some embodiments according to the invention, the application when activated can provide the artificially intelligent avatar. In operation, the AI avatar is provided in a form of an image on the television screen generated using the user selected items from the library or the video input. In operation, the AI avatar can simulate interaction with the user by being provided with real time audio form the environment and provide feedback via facial movement and lip movement so as to better mimic the immersive experience of dealing with a person rather than a machine.

Accordingly, the user can provide audio input to the device plugged into the TV that is provided in turn to the application operating the AI avatar. In turn, the AI avatar can issue commands to attached devices to carryout instructions provided by the user. In still further embodiments according to the invention, the AI avatar can also access other alternative AI avatars so that the user can select the avatar which best suits the user's needs. In still further embodiments according to the invention, the AI avatar can operate as an executive application that issues commands to other artificial intelligent avatars or artificially intelligent applications based on the requirements of the particular requests made by the user. For example, in some embodiments according to the invention, the executive AI avatar can select among a plurality of different AI applications based on the nature of the request made by the user, such as to turn on or off particular devices.

In still further embodiments according to the invention, earbuds can be provided with replaceable batteries that are magnetically coupled to the outer surface of the earbuds for ease of replacement. For example, in operation, when a particular battery is depleted or needs to be recharged, it can be decoupled from the magnetic surface of the earbud and placed onto, for example, the bracelet described herein for recharging. Still further, a fresh charged battery can be placed onto the earbud to provide power to the earbud via wireless power transfer. In still further embodiments according to the invention, the fresh battery can be stored on the bracelet described herein. In still further embodiments according to the invention, an outer surface of the battery can be marked with a logo or design. In still further embodiments according to the invention, particular batteries can have coded information stored therein which may be associated with particular applications or other information utilized by the earbud or application that provides audio to the earbuds. For example, a first battery can provide a code to the earbuds which activates a particular application on the music application providing audio data to the earbuds. A second battery when coupled to the earbuds can operate a different application or can provide a different configuration for the earbuds such as equalization settings, or other audio settings defined by the user or predefined.

In still further embodiments of the invention, the devices as described herein may be used to control appliances of the user, for example, but not limited to, gaming consoles and systems, the home and/or a car. In some embodiments, the devices may be used to control lighting, temperature, etc. in the home. This control may be in the form of voice control. In other embodiments, a device according to the invention that is connected to a user's phone, including e-mail and apps thereon, will auto-connect to the car to permit access and control of the phone via controls on the car.

In still further embodiments, the devices as described herein may be used to contact emergency services, for example, police, fire, EMS, or the military. Moreover, personnel of the same emergency services may be able to use devices according to the invention to communicate with one another and/or the user in need of emergency services. For example, devices according to the invention may permit the emergency services, for example, a 911 operator, to communicate with the user of the device in need of emergency services via voice communication.

In still further embodiments according to the invention, the batteries can include a touch sensitive surface that provides control input to the application as described in U.S. Ser. No. 15/628,206, entitled Audio/Video Wearable Computer System with Integrated Projector filed in the U.S. Patent and Trademark Office on Jun. 20, 2017 the entire content of which is incorporated herein by reference.

It will be understood that each of the devices described herein can operate as a headphone or wearable computer or wearable device described here and can have all of the functions described in each of those systems along with the capabilities described with respect to third party applications and services.

Figure 17:
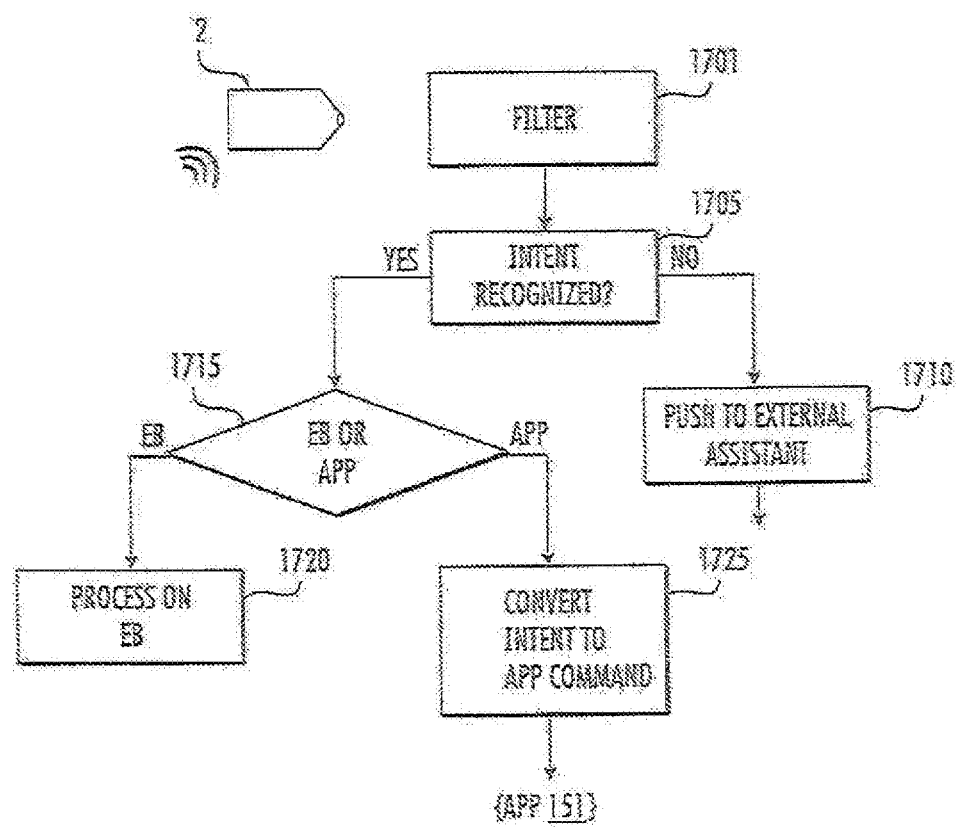
FIG. 17 is a flowchart illustrating the processing of audio data for the determination of intent and distribution within curated experiential eco-system in some embodiments according to the invention.

FIG. 17 is a flowchart illustrating the processing of audio data for the determination of intent and distribution within curated experiential eco-system in some embodiments according to the invention. According to FIG. 17, the user can speak into the microphone associated with the earbud shown in FIGS. 1 and 2 which generates audio data that is processed by a filter (block 1701). The audio data is processed to recognize an associated intent (block 1705). If the associated intent is not recognized (block 1705), the data for the associated intent can be forwarded to an external assistant, such as Siri, Alexa, Google Assistant, or the like (block 1710).

If the associated intent is recognized (block 1705), the data for the associated intent can be forwarded to either the earbud (if the associated intent is to control the earbud, such as volume etc.) or to the app 151 if the associated intent is to provide a curated experience using an app experience compiler (block 1725) wherein the associated intent can be converted to an app command and forwarded to the app 151.

Figure 18:
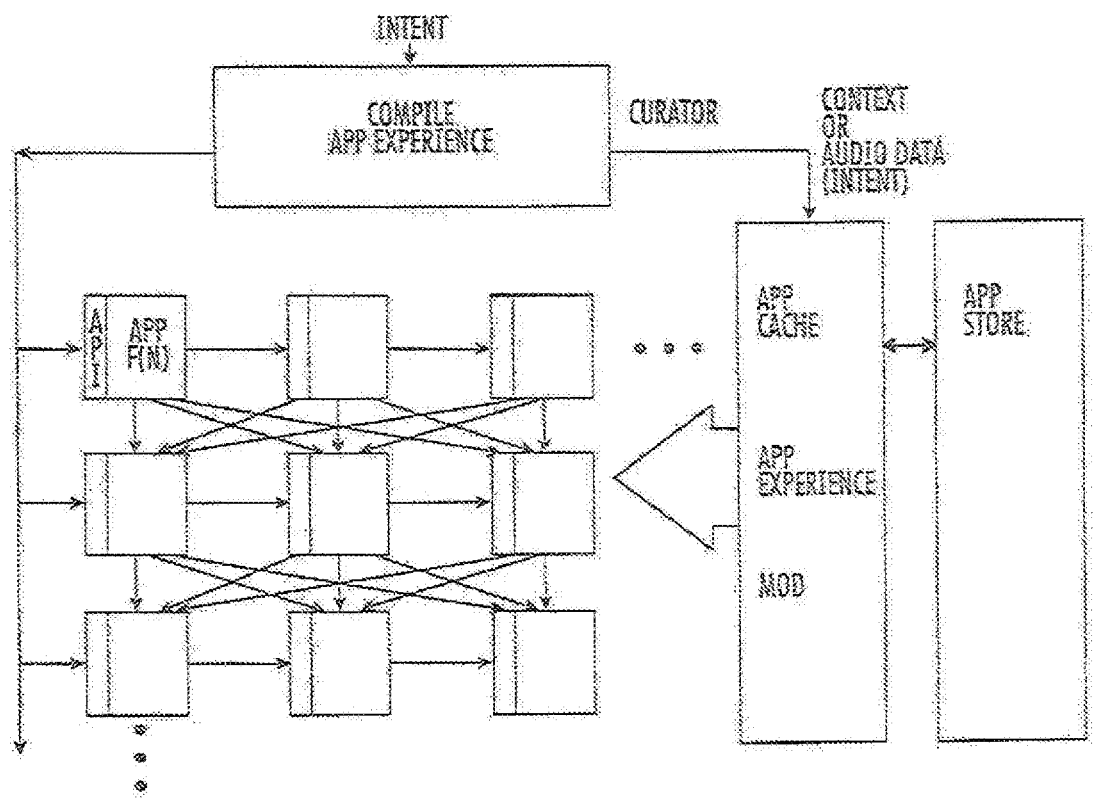
FIG. 18 is a schematic diagram of an experiential system operating with the devices shown in FIG. 1 including true wireless earbuds, a bracelet, and a mobile phone in some embodiments according to the invention.

FIG. 18 is a schematic diagram of an experiential system operating with the devices shown in FIG. 1 including true wireless earbuds, a bracelet, and a mobile phone in some embodiments according to the invention. According to FIG. 18, the data for the associated intent is provided to an app experience compiler (sometimes referred to as a curator) which is configured to compile available apps (or functions within apps) for instantiation to provide a curated experience based on the associated intent. In particular, the curator can select particular apps to be part of the experience without intervention from the user so as to promote a more "head-up" experience for the user. For example, the curator can select a set of particular apps that are compiled (or combined) to carry out action that are configured to achieve the associated intent without the user selecting those apps or without knowing of those apps suitability of even existence prior to compilation.

As further shown in FIG. 18, the system can have access to an "app store" which contains a universe of apps for numerous functions such as transportation, entertainment, travel, shopping, navigation, which can be instantiated (via APIs) and connected in a cross-bar type array so that the output of any apps can be coupled to the input of any other app. In some embodiments, the cross-bar type array can include functions of apps that can be compiled to achieve a particular intent. In other words, an entire app may be part of a compilation or only selected functions of the app (both available via an associated API). The curator can provide a control signal to select the interconnections between apps (or functions) by accessing the particular API. For example, the curator may assemble 4 apps for compilation to achieve a particular intent. Those four apps can be coupled together (by controlling the cross-bar type array) so that the proper inputs are coupled to the correct inputs. Furthermore, the curator may periodically or dynamically fetch new apps from the app store to be available within an app cache so that the new app can be available for compilation to provide an experience (it will be understood that the replacement of apps within the cache can be done without the permission or knowledge of the user. It will be further understood that the apps that are to be compiled to provide a curated experience for a particular situation can be provided by the use of a deep neural network that can be trained For example, in a case where a user is passing a coffee shop, the user may say "buy my usual" whereupon the experiential system would determine the identity of a nearby coffee shop that has an associated app (based on location data), the associated app can be complied and instantiated and provided with the data needed to achieve the desired intent (to buy a coffee that is a usual purchase by the user) such as menu selection, user name, purchase information, and return an estimated time for order completion or notice that the order is available. All of these atomic operations can be performed with the user's intervention (such as opening the app, typing, in the order, name, and purchase information) which allows the user to keep her "head-up" while also achieving the desired intent.

In still further embodiments, in an experience that can be labeled "Never Late" Calendar, Maps, and Uber or Lyft apps may be compiled together via respective API's to determine the best time to use an AI to order a car or pick up a friend. In some embodiments, an event is triggered automatically based on a known scheduled meeting that is upcoming and known location of the user. The system would use this context data to ask the user if transportation should be arranged given the distance traffic. The user may instruct the system to ordered transportation or automatically order the transportation.

In still further embodiments, in an experience that can be labeled "Home Team" calling and messaging apis can be compiled to allows calls in response to audio input to call or message a person or a group. The crossbar type array can operate as a switchboard to initiate all calling or messaging favorite groups just by saying the group name. In still further embodiments, conference calls can be recorded these conference calls in the future and use speech to text technology to index the information on salesforce or post call to team on slack or box or Dropbox or google drive integration and storage subscription.

In still further embodiments, in an experience that can be labeled "location Based Content" Maps and brand content library can be used to play content based on geographic location. So a user can walk into their favorite stores or interact with their favorite brands by saying the product name can activate content or offers to users.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, steps, operations, elements, and/or components, but do not preclude the presence or addition of one or more other features, steps, operations, elements, components, and/or groups thereof. Elements described as being "to" perform functions, acts and/or operations may be configured to or other structured to do so.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments as set forth herein may be described with reference to flowchart illustrations and/or block diagrams of methods, systems and computer program products according to such embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Many different embodiments have been disclosed herein, in connection with the above description and the drawings. It will be understood that it would be unduly repetitious and obfuscating to literally describe and illustrate every combination and sub-combination of these embodiments. Accordingly, all embodiments can be combined in any way and/or combination, and the present specification, including the drawings, shall support claims to any such combination or sub-combination.

What is claimed:

1. A system to provide a curated experience, the system comprising:
    an application experience compiler configured to receive data indicating an intent for a user to complete a transaction based on spoken audio;
    a cross-bar array of a plurality of apps, wherein each app is configured to perform at least a discrete function included as part of the transaction, the cross-bar array of the plurality of apps configured to combine selected ones of the plurality of apps using respective apis of the plurality of apps to carry out the transaction; and an app store coupled to the cross-bar array of the plurality of apps, wherein the application experience compiler is configured to select from among apps in the app store.

2. The system of claim 1 wherein the application experience compiler is provided external to a true wireless headphone.

3. The system of claim 1 wherein the application experience compiler is configured to combine the ones of the plurality of apps for instantiation to provide a curated experience based on the intent.

4. The system of claim 1 wherein the application experience compiler is configured to combine functions within the ones of the plurality of apps for instantiation to provide a curated experience based on the intent.

5. The system of claim 4 wherein the application experience compiler is configured to combine the functions within the ones of the plurality of apps without the user selecting the ones of the plurality of apps.

6. The system of claim 1 wherein the application experience compiler is configured to dynamically fetch new apps from the app store.

7. The system of claim 1 wherein the application experience compiler is configured to select the ones of the plurality of apps for combination using a deep neural network.

8. The system of claim 1 wherein the transaction comprises an intent to purchase an item whereupon data including a menu selection, a user name, and/or purchase information is provided to at least one of the plurality of apps responsive to the intent to carry out the purchase.

9. The system of claim 1 wherein the transaction comprises transportation whereupon data including a location, a destination, traffic information, and/or a scheduled meeting time is provided to at least one of the plurality of apps responsive to the intent to arrange transportation.

10. The system of claim 1 wherein an audio prompt is provided to the user prior to the application experience compiler receiving the audio input.

11. The system of claim 10 wherein the audio prompt is responsive to a location of the user, a scheduled meeting for the user, proximity of the user to a location where the user has previously purchased an item.

12. The system of claim 1 wherein the application experience compiler is configured to provide data configured to instantiate at least one of the plurality of apps, providing order, name, and/or purchase information to the at least one of the plurality of apps.

13. The system of claim 1 wherein the transaction comprises messaging a group whereupon data including contact information for the group and/or message content.

14. The system of claim 13 wherein the transaction is responsive to an incoming message or call received by the user.

15. The system of claim 1 wherein the transaction comprises content provisioning wherein data including location information and/or favorite brand information is provided to at least one of the plurality of apps responsive to the intent.

16. A system to provide a curated experience, the system comprising:

an application experience compiler configured to receive data indicating an intent for a user to complete a transaction based on spoken audio;

a cross-bar array of a plurality of apps, wherein each app is specified to perform at least a discrete function included as part of the transaction, the cross-bar array of the plurality of apps configured to couple outputs of ones of the plurality of apps to inputs of others of the plurality of apps using respective apis of the plurality of apps;

an app cache configured to store selected apps for inclusion in the cross-bar array of a plurality of apps based on a determination that the selected apps provide at least one function for a transaction associated; and an app store coupled to the app cache, wherein the application experience compiler is configured to select from among apps in the app store for inclusion in the app cache without input from the user.

* * * * *